(12) United States Patent
Sumner et al.

(10) Patent No.: US 6,252,740 B1
(45) Date of Patent: *Jun. 26, 2001

(54) DISK DRIVE CARTRIDGE DOOR

(75) Inventors: Wayne A. Sumner, Ogden; Allen T. Bracken, Layton; David W. Griffith, Layton; David E. Jones, Layton; Edward L. Rich, Ogden, all of UT (US)

(73) Assignee: Iomega Corporation, Roy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/506,638

(22) Filed: Feb. 18, 2000

Related U.S. Application Data

(63) Continuation of application No. 09/196,923, filed on Nov. 19, 1998, now Pat. No. 6,094,327, which is a continuation of application No. 09/066,149, filed on Apr. 24, 1998, now Pat. No. 5,856,901, which is a continuation of application No. 08/834,256, filed on Apr. 15, 1997, now Pat. No. 5,768,074, which is a continuation of application No. 08/550,819, filed on Oct. 31, 1995, now Pat. No. 5,671,109, which is a continuation-in-part of application No. 08/482,010, filed on Jun. 7, 1995, now Pat. No. 5,570,252.

(51) Int. Cl.[7] .................................................. G11B 23/03
(52) U.S. Cl. ............................................................. 360/133
(58) Field of Search ............................... 360/133; 369/291

(56) References Cited

U.S. PATENT DOCUMENTS

| | | | |
|---|---|---|---|
| 3,854,784 | * 12/1974 | Hunt et al. ............................ 312/319 |
| 4,045,821 | * 8/1977 | Fujikura ................................ 360/132 |
| 4,320,430 | * 3/1982 | Vogt ...................................... 360/133 |
| 4,400,748 | * 8/1983 | Bauck et al. ........................ 360/99.02 |
| 4,459,628 | * 7/1984 | Barton .................................. 360/133 |
| 4,532,564 | * 7/1985 | Larson et al. ...................... 360/99.06 |
| 4,550,354 | * 10/1985 | Wakabayashi et al. .............. 360/133 |
| 4,559,575 | * 12/1985 | Noto et al. ........................... 360/133 |
| 4,608,617 | * 8/1986 | Oishi et al. .......................... 360/133 |
| 4,864,452 | * 9/1989 | Thompson et al. .................. 360/133 |
| 4,879,621 | * 11/1989 | Chamberlin et al. ................ 360/133 |
| 4,901,173 | * 2/1990 | Jones et al. ........................ 360/99.04 |
| 5,216,558 | * 6/1993 | Griffith et al. ..................... 360/99.06 |
| 5,381,402 | * 1/1995 | Lee et al. ............................ 369/291 |
| 5,440,436 | * 8/1995 | Iftikar et al. ...................... 360/99.12 |
| 5,444,586 | * 8/1995 | Iftikar et al. ...................... 360/99.12 |
| 5,481,420 | * 1/1996 | Cardona et al. .................. 360/99.06 |
| 5,515,358 | | 5/1996 | Goto ...................................... 360/133 |
| 5,537,281 | * 7/1996 | Ma et al. .............................. 360/133 |
| 5,570,252 | * 10/1996 | Sumner et al. ....................... 360/133 |
| 5,671,109 | * 9/1997 | Sumner et al. ....................... 360/133 |
| 5,768,074 | * 6/1998 | Sumner et al. ....................... 360/133 |
| 5,856,901 | * 1/1999 | Sumner et al. ....................... 360/133 |

OTHER PUBLICATIONS

"Disk release mechanism for magnetic disk cartridge," *IBM Tehcnical Disclosure Bulletin*, 1979, 2499–2500.

* cited by examiner

*Primary Examiner*—Brian E. Miller
(74) *Attorney, Agent, or Firm*—Woodcock Washburn Kurtz Mackiewicz & Norris LLP

(57) ABSTRACT

A cartridge for a magnetic disk drive has a rigid shell and a flexible door which covers an opening through which read/write heads engage the recording medium. The flexible door is guided outside of the shell to an open position as the cartridge is inserted into the drive. A projection on a flexible arm in the drive catches a hole in the flexible door to open it as the cartridge is inserted into the drive. The door along the outside of the cartridge conserves space so that the recording medium can be large for a given form factor drive.

6 Claims, 11 Drawing Sheets

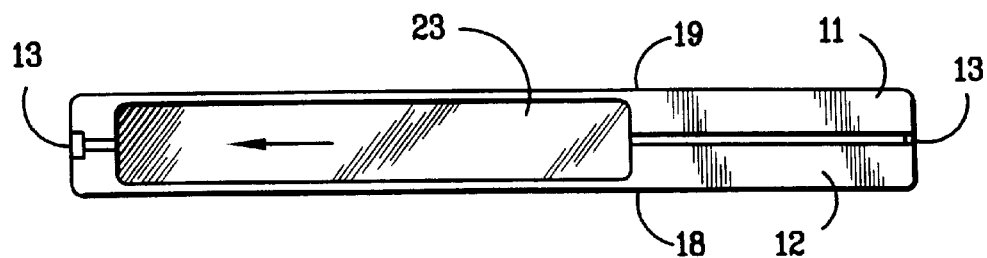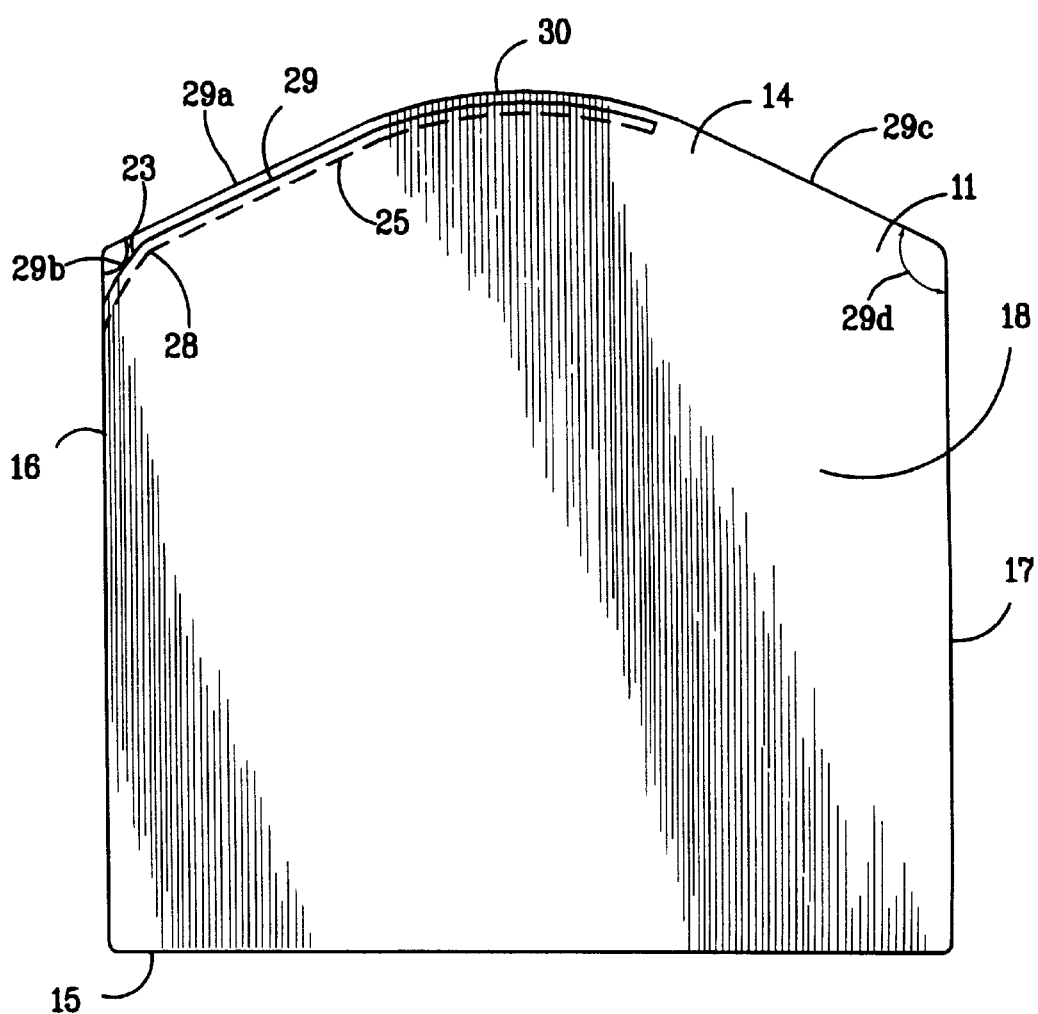

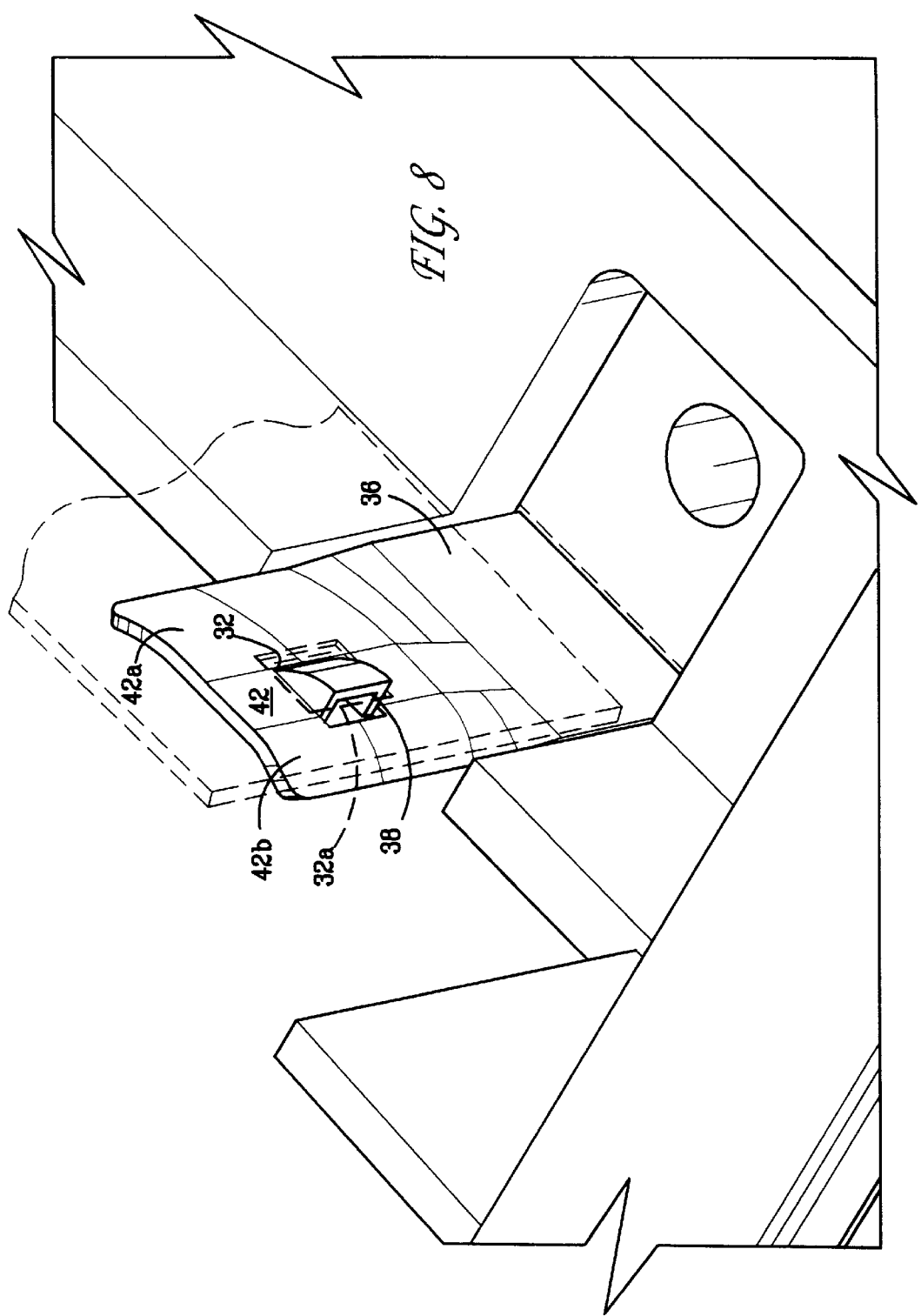

DISK DRIVE CARTRIDGE DOOR

RELATED APPLICATION

This Application is a continuation of claims benefit of U.S. provisional application Ser. No. 09/196,923 filed Nov. 19, 1998 which issued on Jul. 25, 2000 as U.S. Pat. No. 6,094,327 which is a continuation of Ser. No. 09/066,149 filed Apr. 24, 1998 which issued on Jan. 5, 1999 as U.S. Pat. No. 5,856,901 which is a continuation of Ser. No. 08/834,256 filed Apr. 15, 1997 which issued on June 16, 1998 as U.S. Pat. No. 5,768,074 which is a continuation of Ser. No. 08/550,819, filed Oct. 31, 1995 which issued on Sep. 23, 1997 as U.S. Pat. No. 5,671,109 which is a CIP of Ser. No. 08/482,010 filed Jun. 7, 1995 which issued on Oct. 29, 1996 as U.S. Pat. No. 5,570,252.

BACKGROUND OF THE INVENTION

This invention relates to data storage drives and more particularly, to a removable cartridge for magnetic disk drives.

Magnetic disk drives which write and read digital data from flexible magnetic disks have been extensively used. "Floppy disk drives" have been extensively used for small, so-called microcomputer systems, for word-processing applications and the like. The flexible disk cartridge includes a relatively thin, flexible jacket which is inserted into the floppy disk drive.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive. Rigid disks enclosed in a rigid, removable cartridge, or shell have also been used. U.S. Pat. No. 4,864,452-Thompson, et al is an example of such a drive.

"Bernoulli" disk drives having performance characteristics similar to that of Winchester drives, but with removable cartridges, have been developed. A flexible magnetic disk is enclosed in a rigid box which is normally completely closed. U.S. Pat. No. 4,400,748- Bauck, et al and related patents to the common assignee show such drives using Bernoulli stabilized flexible disks. U.S. Pat. No. 4,901,173- Jones et al and related patents to a common assignee, show improvements which relate to so-called "half heights" drives.

The catridges for these drives have a door which closes the cartridge when it is removed from the drive. This prevents debris from contaminating the magnetic recording medium when the cartridge is not in the drive. When the cartridge is inserted into the drive, this door slides to an open position to provide access for the magnetic recording heads to engage the recording medium.

U.S. Pat. No. 5,216,558- Griffith, et al shows a drive for a rigid cartridge in which the cartridge door slides to an open position inside of the cartridge. In the aforementioned Thompson, et al patent, the door also slides to an open position inside the cartridge. In these drives, and in the cartridges used therein, space is at a premium. The cartridge has a narrow width into which the door must fit. This width is constrained by the relative size of the disk drive form factor. Also, the size of the disk relative to size of the casing severely limits the amount of room which is available inside the cartridge. It is desirable to have the disk occupy as much space within the cartridge as possible. This provides the maximum data storage capacity for a given drive form factor.

It is an object of the present invention to provide a cartridge with a sliding door which optimizes the amount of space available for the recording medium for a given form factor drive.

SUMMARY OF THE INVENTION

In accordance with the present invention, a thin, flexible door slides in narrow parallel tracks in the two halves of the cartridge shell. The door travels in tracks which guide the door outside of the cartridge parallel to the side of the cartridge when it is inserted into the drive. This exposes the disks in the cartridge to read/write head access.

A small projection on the end of a flexible arm catches the cartridge door, which is initially in its closed position, and pulls it out and along side the cartridge into the open position as the cartridge is inserted into the drive. The flexible arm insures that the projection will catch the cartridge door no matter where the cartridge is located in the drive opening. Special curved surfaces around the small projection control its penetration into a groove along the cartridge side.

The narrow space constraint into which the door must fit is caused by the relative size of the drive form factor and the disk size in the cartridge. Because the door slides outside of the cartridge, space inside of the cartridge is conserved.

The foregoing and other features, advantages and objects of the invention will be better understood from the following more detailed description and appended claims.

SHORT DESCRIPTION OF THE DRAWINGS

FIG. 1 shows a top view of the cartridge of the present invention;

FIG. 2 is a front view of the cartridge;

FIG. 8 shows the projection which opens the door;

Figure 9A:
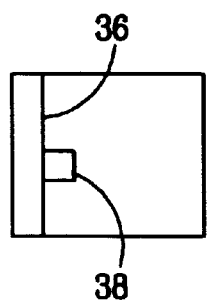
Figure 9B:
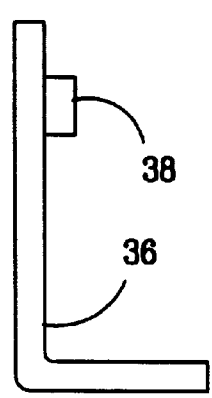
Figure 9C:
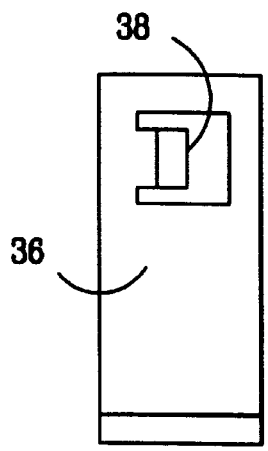
Figure 10:
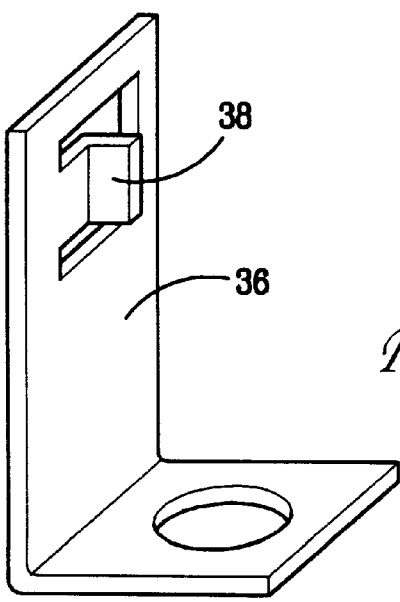
Figure 11:
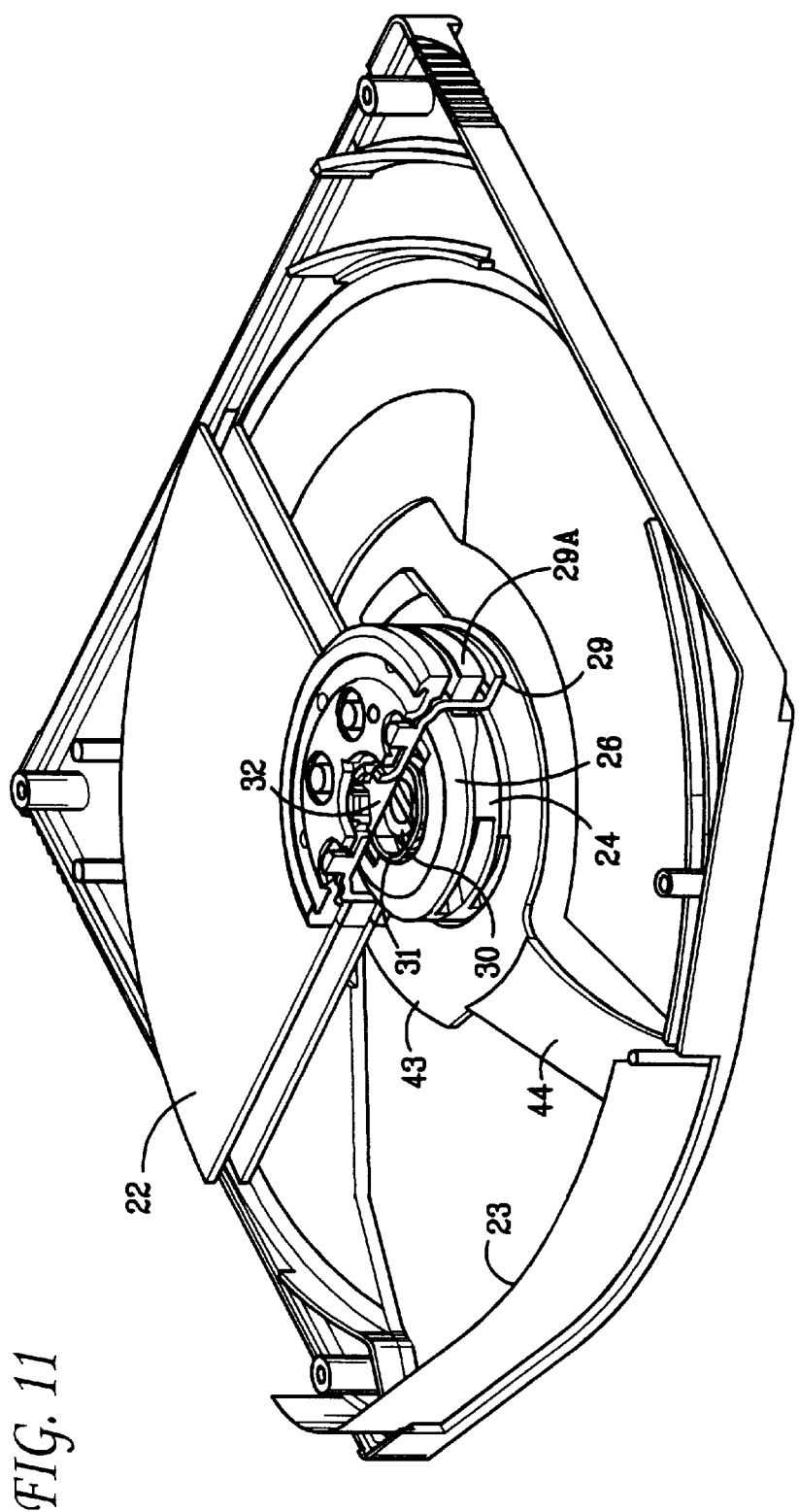
Figure 12:
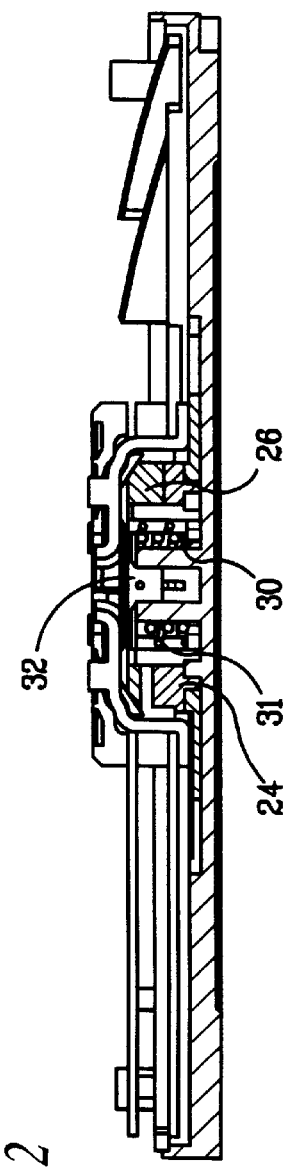
Figure 13:
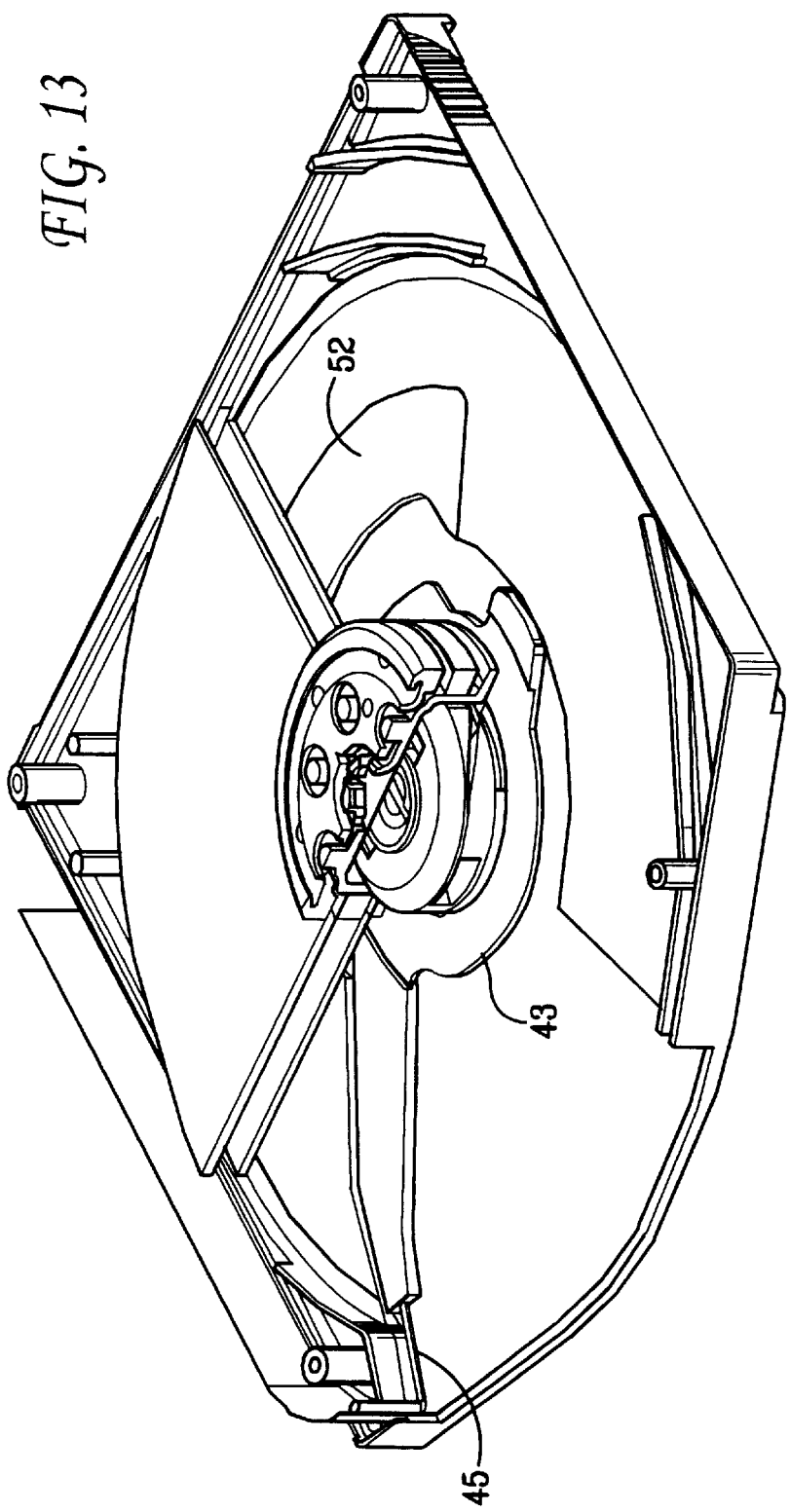
Figure 14:
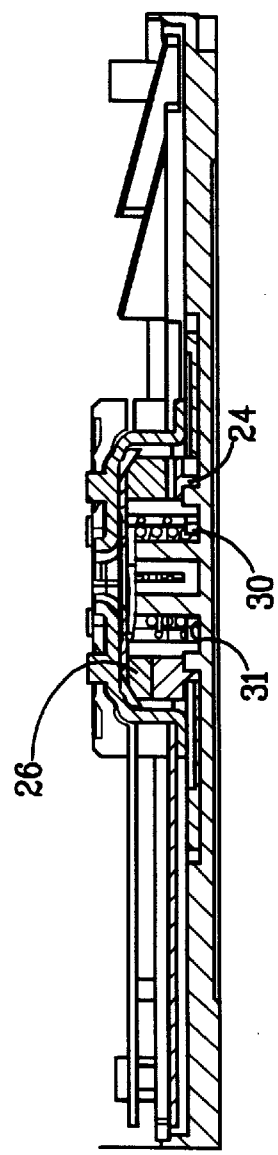

FIGS. 9A—9C are top, front and right side view of the projection;

FIG. 10 is an isometric view of the projection;

FIG. 11 is a broken away perspective view of a preferred embodiment of the invention with the door in the closed position;

FIG. 12 is a cross-section of the cartridge of FIG. 11;

FIG. 13 is a broken-away perspective view of the cartridge of the preferred embodiment with the door in the open position;

FIG. 14 is a cross-section of the cartridge of FIG. 13; and

Figure 15:
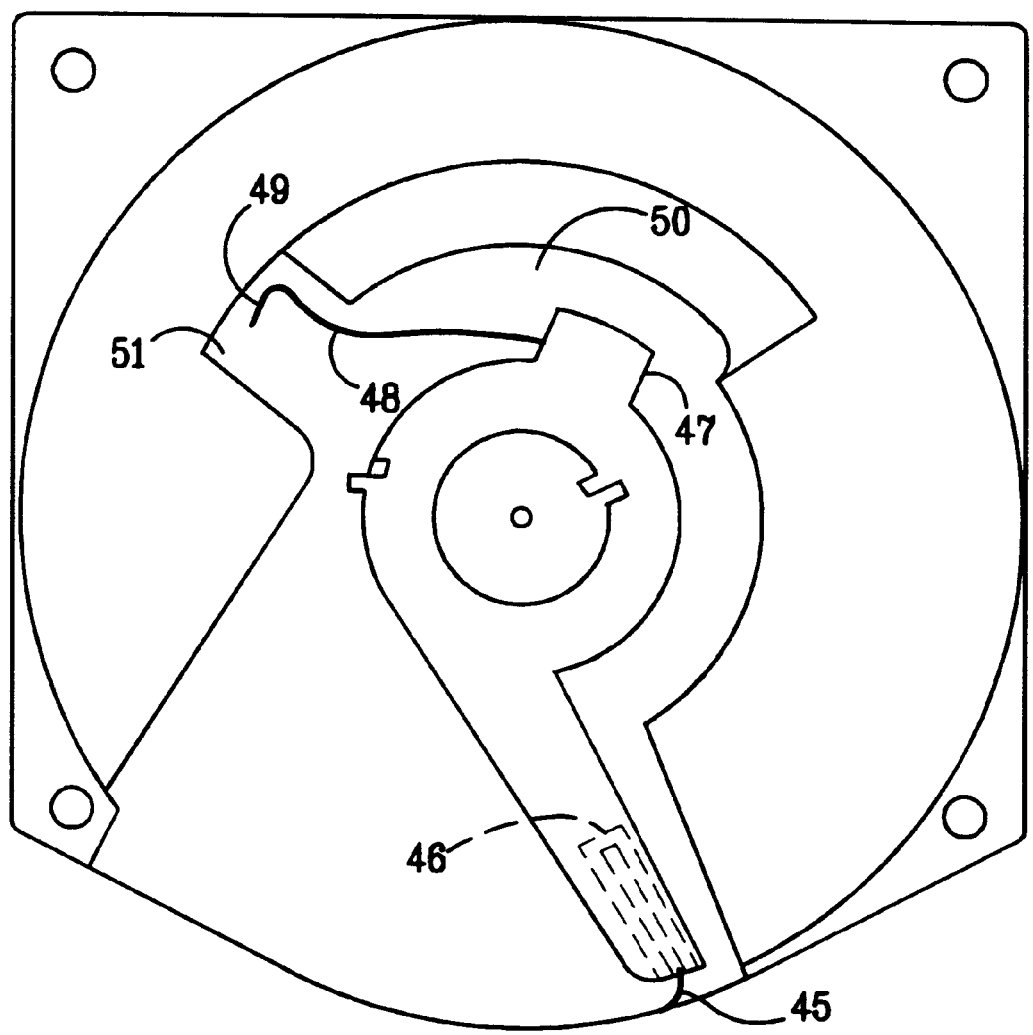

FIG. 15 is a top-plan view of the cartridge with the top shell and disks removed.

DESCRIPTION OF THE PREFERRED EMBODIMENT

Figure 3:
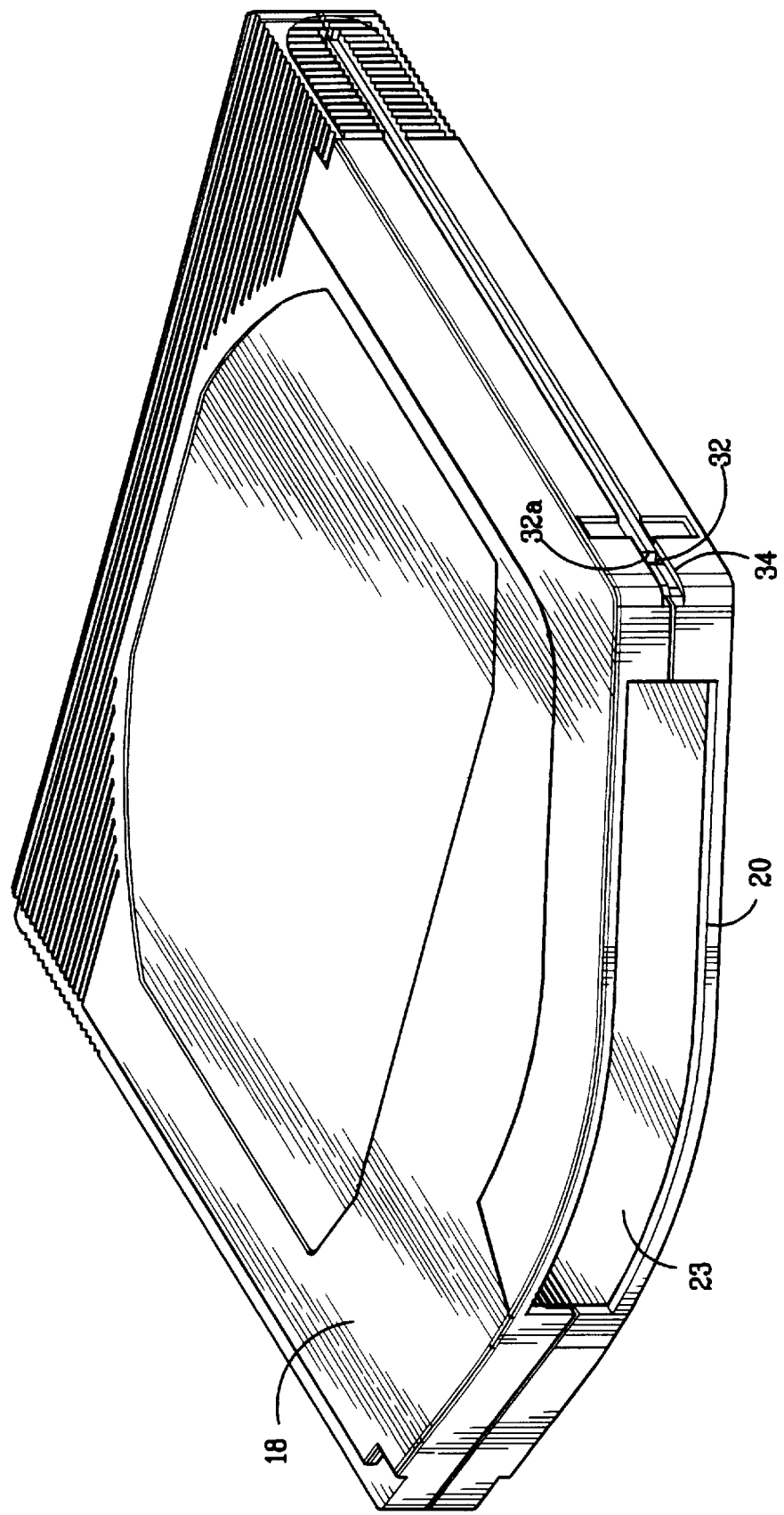
FIG. 3 is an isometric view of the cartridge with the door closed.
Figure 4:
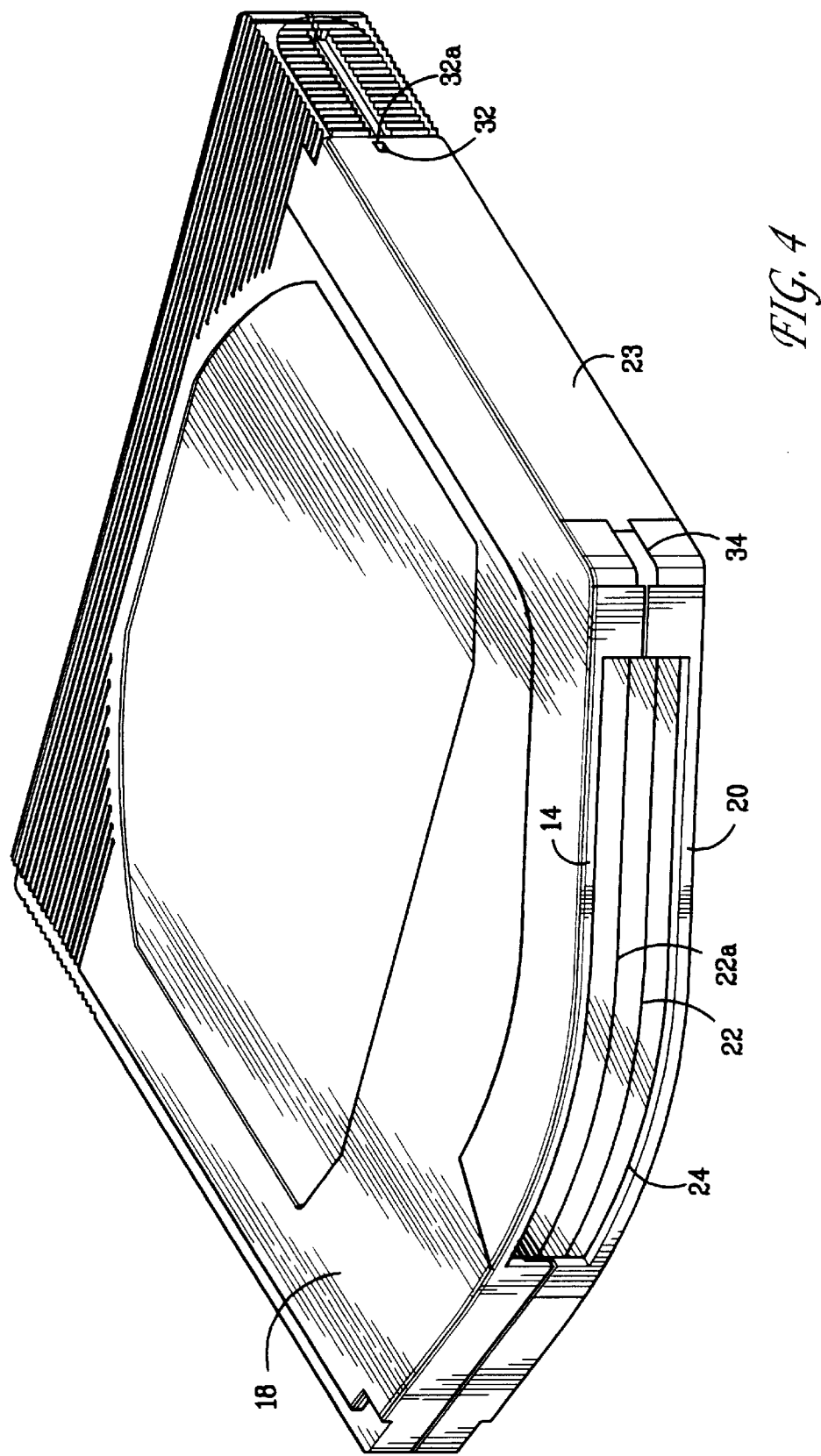
FIG. 4 is an isometric view of the cartridge with the door open.
Figure 5:
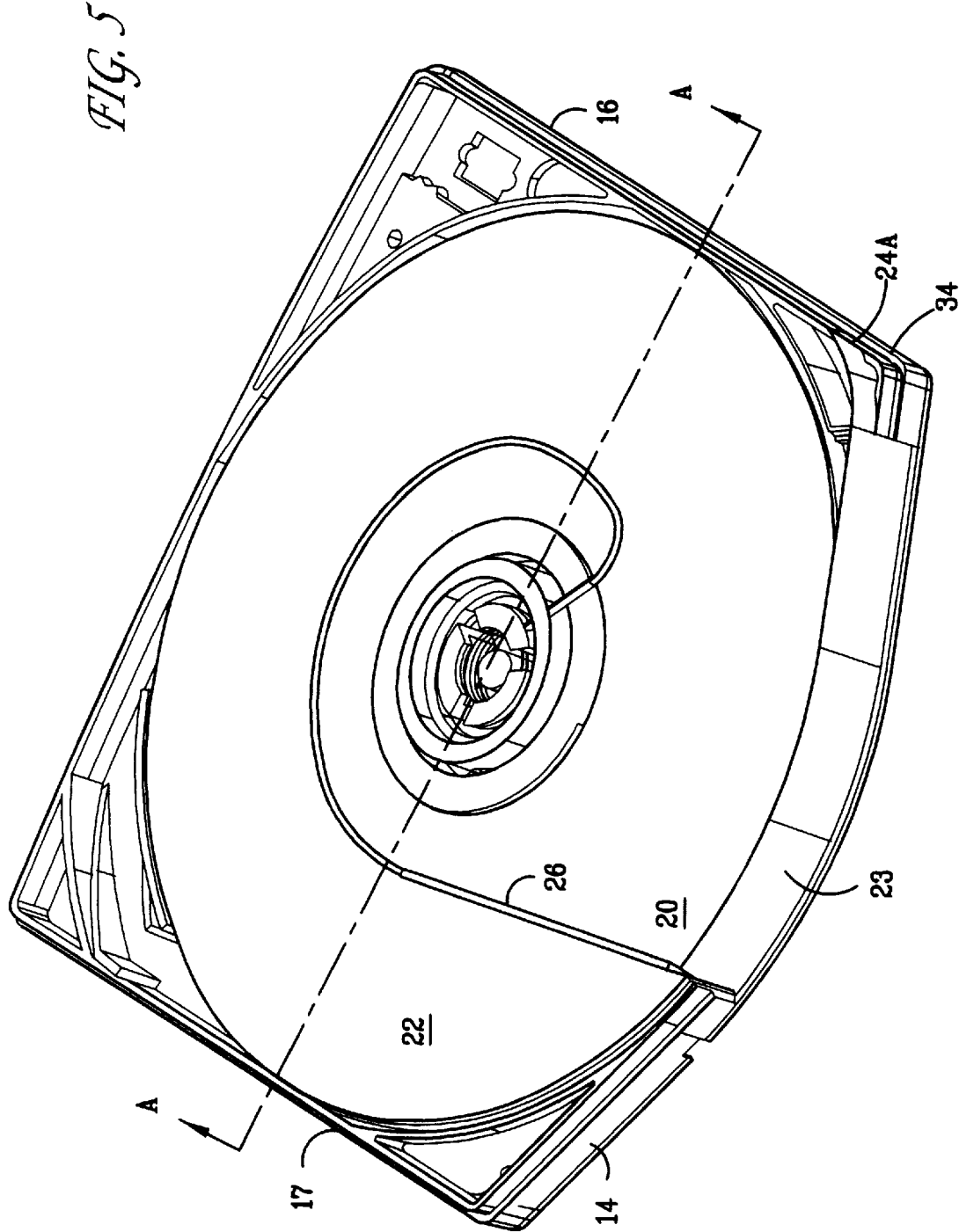
FIG. 5 shows an isometric view of the cartridge with the top shell removed.

FIGS. 1–5 show a cartridge having two halves 11 and 12 joined together at 13. The cartridge has a front 14, a back 15 and two sides 16 and 17 between substantially flat, planar surfaces 18 and 19. An opening 20 in the front of the cartridge provides access by the read/write heads 21 (FIG. 7) to the recording disks 22, 22A (FIG. 4). A flexible door 23 covers the opening when the cartridge is removed from the drive.

Track 24 and a corresponding track 25 in the top half shell, guide the door outside of the shell when the door is opened. The tracks extend along the front 14 and guide the door to a position along one side 16 of the shell when the door is opened. The flexible door 23 slides in the tracks from a closed position, shown in FIG. 3, in which it covers the opening 20, to the open position as shown in FIG. 4. The door 23 slides along the outside of the shell along the side 16 when the cartridge is inserted into the drive. The spring 26 biases the door into the closed position.

The track has a small radius 28 at the corner between the side 16 and the front of the cartridge. A straight section 29 is between the small radius 28 and the large radius 30 at the front of the cartridge. The door is sufficiently flexible to follow the door tracks around the large radius 30, through the straight section 29, and the small radius 28. The cartridge has straight portions 29a and 29c form an obtuse angle 29b with side 16 and another obtuse angle 29d with side 17.

The door 23 has a width approximately co-extensive with the width of the shell. The length of door 23 is sufficient to cover the opening 20 in the closed position and short enough to fit along the side 16 of the cartridge when it is in the open position. The length and width of the door are constrained by the form factor of the drive and the size of the recording disks 22 and 22A which occupy most of the interior of the cartridge.

The flexible door 23 has a hole 32 at the end thereof which forms a door opening member 32a. A projection 38 on the drive catches the opening portion of door opening member 32a when the cartridge is inserted into the drive to pull the door to the open position. A groove 34 in the corner of the cartridge guides the projection to the hole 32.

Figure 6:
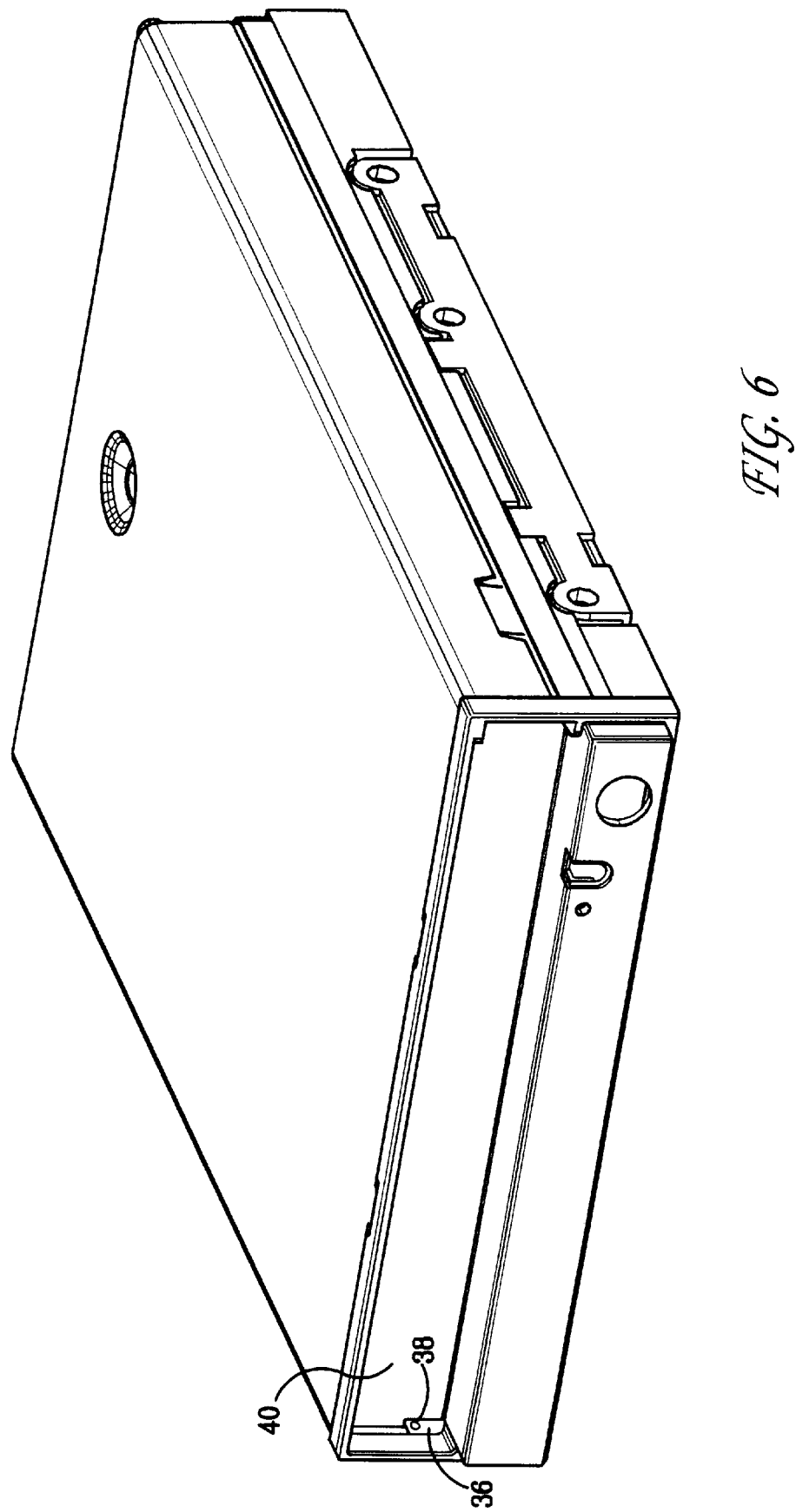
FIG. 6 shows the drive.
Figure 7:
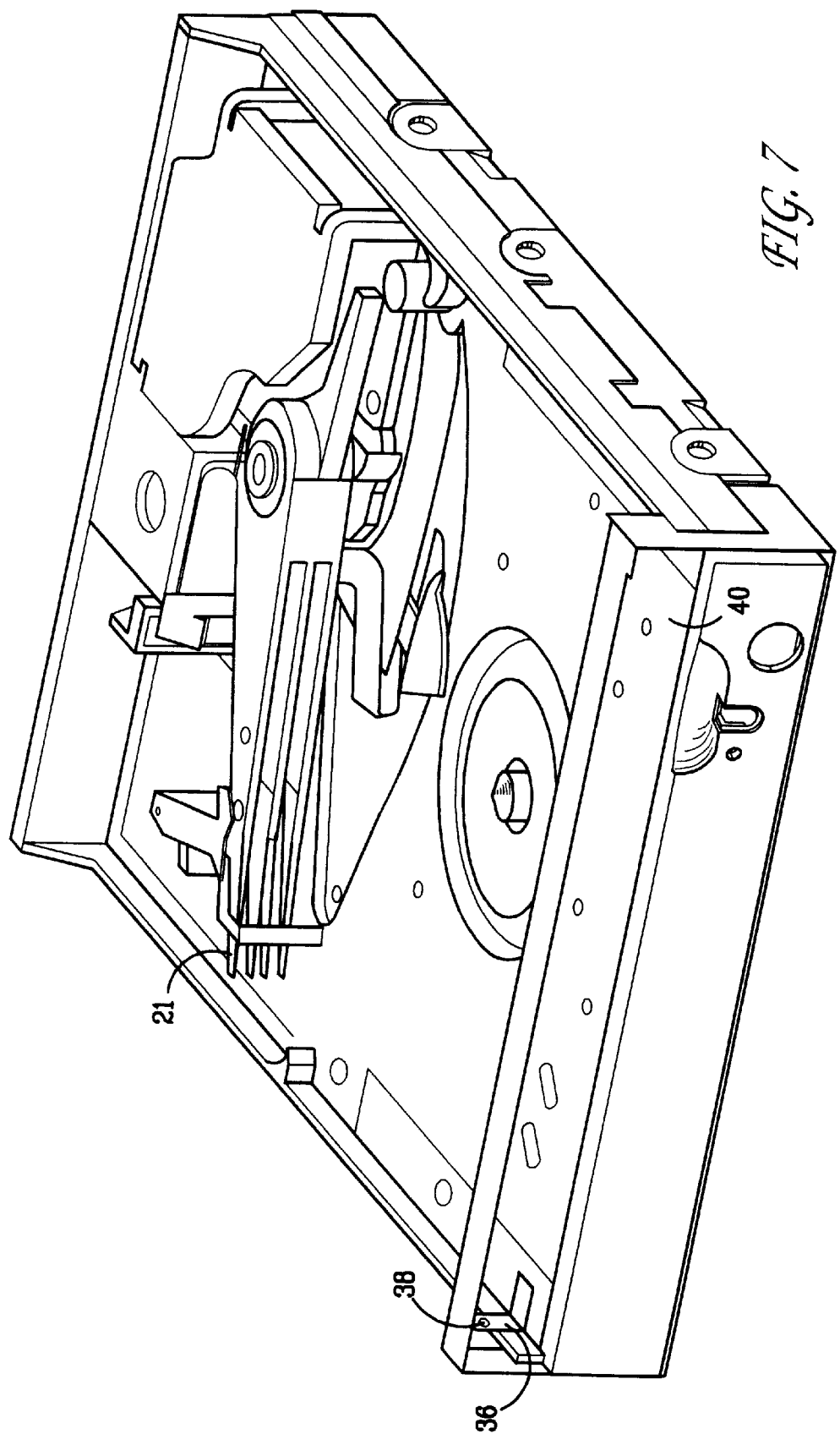
FIG. 7 shows the drive with the cover removed.

FIGS. 6 and 7 show the drive. A projection 38 on the flexible L-shaped arm 36 catches the hole 32 when the cartridge is inserted into the drive.

FIG. 8 shows the projection 38 in more detail. Special features 42 include curved surfaces 42a and 42b around the projection 38. These surfaces control the penetration of the projection 38 into the groove 34 along the cartridge side. This ensures proper engagement of the projection 38 and hole 32.

FIGS. 9A–C and 10 show, top, front, side and isometric views, respectively, of the flexible arm 36 on which the projection 38 is mounted. The flexibility of arm 36 ensures that the projection 38 will catch the hole 32 in the door no matter where the cartridge is located in the slot 40 in the drive. This variation in cartridge location is caused by normal manufacturing tolerances.

FIGS. 11–15 show a preferred embodiment of the invention in which the connection between the clamping mechanism and the door is a member 43 which is rotatable about the axis of the disks. Rotatable member 43 has an arm 44 extending radially toward the door 23. The terminal end of arm 44 is connected to the door by the wire 45. (FIG. 15). Wire 45 is disposed in an opening 46 in the arm. The wire telescopes into and out of the opening 46 as the door travels through its stroke. This accommodates the varying radial distance to the door throughout its stroke.

A protrusion 47 on the arm has a spring 48 which provides the closing force needed to close the door through the last portion of its travel. The spring 48 has a bent end 49 which travels in the arcuate path 50. The arcuate path has a notch 51 at the closing end thereof. As the bent end 41 travels along arcuate path 50, it drops into the notch 51 at the closing end of the door stroke. This provides the extra force necessary to close the door.

Arcuate path 50 is a depression in the face of the cartridge. This depression has a cover 52 so that the spring 48, and its bent end 49 travel in a closed path.

Other embodiments are within the true spirit and scope of the invention. The appended claims, are therefore, intended to cover all such embodiments.

What is claimed is:

1. A cartridge for use in a disk drive, the disk drive including a read/write head for reading and recording information, the cartridge comprising:

a shell having a top portion and a bottom portion, a pair of opposing edges, a back edge disposed substantially orthogonal to each one of the pair of side edges, and a front edge that protrudes outwardly from each one of the pair of side edges to form a pair of obtuse angles therebetween, the front edge having a protruding portion at the center thereof, each one of the top portion and the bottom portion having a gripping feature formed thereon for enhancing gripping thereof, the gripping feature disposed opposite the protruding portion;

a rotatable recording medium in said shell upon which information may be written or read, disposed at least partially between the top portion and the bottom portion, a portion of the recording medium disposed in the protruding portion;

a first opening in the said protruding portion of said front edge for access by said read/write head from outside said shell to said recording medium;

a door movable between an open position and a closed position, the door covering said first opening when the said door is in said closed position, the door not covering at least a portion of said first opening when the door is in said open position and thereby permitting said read/write head to access the recording medium when the door is in said open position and when the cartridge is inserted into the disk drive; and a door opening member coupled to said door, said door opening member being movable relative to said shell between a first position and a second position, said door being in said closed position when said door opening member is in said first position, said door being in said open position when said door opening member is in said second position.

2. The cartridge of claim 1 wherein each one of the top portion and the bottom portion have a track formed in the protruding portion, said door being movable in said track.

3. The cartridge of claim 1 wherein each one of the top portion and the bottom portion are symmetrical about a plane perpendicular to the top portion and bisect the top portion at a midpoint between the two side edges.

4. The cartridge of claim 1 wherein one of the pair of side edges has a groove formed therein for receiving a projection of the disk drive.

5. The cartridge of claim 2 wherein the cartridge is substantially symmetric about an axis parallel to each one of the pair of side edges.

6. The cartridge of claim 5 wherein the track is asymmetric relative to said axis.

* * * * *